United States Patent
Higashi et al.

(10) Patent No.: US 7,193,730 B2
(45) Date of Patent: Mar. 20, 2007

(54) ECCENTRICITY MEASURING INSTRUMENT OF POLYGON-MIRROR MOTOR

(75) Inventors: Shuji Higashi, Osaka (JP); Yasunori Sakumura, Osaka (JP); Masami Kajihara, Tottori (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 59 days.

(21) Appl. No.: 11/224,020

(22) Filed: Sep. 13, 2005

(65) Prior Publication Data

US 2006/0055917 A1    Mar. 16, 2006

(30) Foreign Application Priority Data

Sep. 16, 2004    (JP)    ............... 2004-269620

(51) Int. Cl.
*G01B 11/14*    (2006.01)
(52) U.S. Cl. .................................... 356/615
(58) Field of Classification Search ........ 356/614–624; 359/824
See application file for complete search history.

(56) References Cited

U.S. PATENT DOCUMENTS 4,537,465 A * 8/1985 Sherman et al. ............ 359/203
5,784,168 A * 7/1998 Ophey et al. ............... 356/615
2006/0066944 A1* 3/2006 Okugawa .................... 359/368
2006/0092405 A1* 5/2006 Higashi et al. ............. 356/127

FOREIGN PATENT DOCUMENTS

| JP | 2-204713 | 8/1990 |
| JP | 5-227710 | 9/1993 |
| JP | 408016306 A * | 1/1996 |
| JP | 408190069 A * | 7/1996 |

* cited by examiner

*Primary Examiner*—Hoa Q. Pham
(74) *Attorney, Agent, or Firm*—Wenderoth, Lind & Ponack, L.L.P.

(57) ABSTRACT

An eccentricity measuring instrument of polygon mirror motors includes a first light source, an optical position detecting element for detecting a position of first reflection light, i.e. first measuring light emitted from the first light source and reflected on the polygon mirror, a second light source, a photo detecting element for detecting a position of second reflection light, i.e. second measuring light emitted from the second light source and reflected on the polygon mirror; and an eccentricity calculator for calculating an output, at a detection of the second reflection light by the photo detecting element, from the optical position detecting element. The second measuring light forms a given angle with the second reflection light, and a plane formed by the first measuring light and the first reflection light intersects with a plane formed by the second measuring light and the second reflection light at right angles.

9 Claims, 6 Drawing Sheets

ECCENTRICITY MEASURING INSTRUMENT OF POLYGON-MIRROR MOTOR

FIELD OF THE INVENTION

The present invention relates to instruments for measuring an eccentricity, in a non-contact manner, of motors which drive a polygon mirror to be used in laser beam printers and full-color copiers.

BACKGROUND OF THE INVENTION

Motors are, in general, subject to eccentricities due to run-out of the shafts. The eccentricity must be prevented as hard as possible in spindle motors which drive a variety of discs. Since the rotating shafts, from which an eccentricity is detected, are shaped like a cylinder, a contact-type dial gauge, an electric micro-meter, or a non-contact type electrostatic capacitance displacement gauge, and a laser displacement gauge are generally used for measuring an eccentricity at sections, i.e. the rotating shafts, subjected to detection.

A specific method of measuring the eccentricity is disclosed in, e.g. Japanese Patent Non-examined Publication No. H05-22710. Besides a first peak sensor that senses a peak value of an output from a displacement gauge, a second peak sensor is provided, so that a difference between the two peak values sensed by these two sensors tells an eccentricity.

In the case of motors driving a polygon mirror, a section subjected to detection is the mirror formed of facets, namely, the mirror is shaped like a non-cylinder. In this case, measurement in a contact manner is not allowed, so that a totally different measuring method is required. The contact-type sensor cannot be used as a matter of fact. Use of a non-contact type capacitance displacement gauge requires placing the gauge near to the motor as close as several tens μm, so that the sensors thereof are subject to collision with an angular polygon mirror. As a result, it is difficult to measure an eccentricity with the non-contact type capacitance gauge. Use of a laser displacement gauge available on the market has a speed of response on the order of microseconds, so that measurable range can be at most several hundreds rotations per minute. Since the polygon mirror rotates several tens of thousand rotations per minute, it is impossible for the laser displacement gauge to measure the eccentricity.

Polygon mirror motors are used in laser-beam printers and full-color copiers, and directly related to the printing quality, so that the motor of high accuracy is required. A polygon mirror is directly connected to an output shaft of a brush-less DC motor and is rotated at a high speed such as several tens of thousand rotations per minute. A method of measuring a dynamic eccentricity of the motor rotating in such a high speed is disclosed in, e.g. Japanese Patent Non-examined Publication No. H02-204713.

FIG. 9 shows a structure of a conventional instrument for measuring an eccentricity of the polygon mirror motor. Polygon mirror 81 rigidly mounted to rotating shaft 80 of the motor spins at a high speed. Laser beam L1 emitted from first laser light beam source 82 enters into polygon mirror 81 at a certain angle, and the reflected laser beam L2 passes through cylindrical lens 87 and travels to position detector 83 which detects a position of the laser beam having undergone lens 87.

On the other hand, laser beam L3 emitted from second laser light beam source 84 passes through half mirror 85, and the passed laser beam L4 enters to polygon mirror 81. The reflected laser beam L5 enters to half mirror 85, and its reflected light beam L6 enters to trigger generator 86.

As shown in FIG. 9, when a reflecting surface of polygon mirror 81 and incident laser beam L4 form right angles, reflection beam L5 enters to half mirror 85, and its reflection light beam L6 enters to trigger generator 86. Thus when polygon mirror 81 becomes a status as shown in FIG. 9, trigger generator 86 generates trigger signals, and observation of output signals from position detector 83 at this time allows measuring an eccentricity.

However, when polygon mirror has a certain angle from the status shown in FIG. 9, laser beam L1 emitted from first light source 82 travels through the path of laser beams L5, L6, and enters to trigger generator 86 besides laser beam L3. As already discussed above, laser beam L3 is emitted from second light source 84 and passes through the same path as beams L5, L6 do, and enters to trigger generator 86. The output signals from generator 86 thus need to isolate false signals made by first light source 82 and extract true trigger signals made by second light source 84.

SUMMARY OF THE INVENTION

An instrument for measuring an eccentricity of a motor which drives a polygon mirror comprises the following elements:

(a) a first light source;

(b) an optical position detecting element for detecting a position of a first reflection light beam, which is a first measuring light beam emitted from the first light source and reflected on the polygon mirror;

(c) a second light source;

(d) a photo detecting element for detecting a position of a second reflection light beam, which is a second measuring light beam emitted from the second light source and reflected on the polygon mirror; and (e) an eccentricity calculator for calculating an output from the optical position detecting element, where the output is taken when the photo detecting element detects the second reflection light beam.

In the foregoing structure, the second measuring light beam forms a given angle with the second reflection light beam, and a plane formed by the first measuring light beam and the first reflection light beam intersects with a plane formed by the second measuring light beam and the second reflection light beam at right angles.

The foregoing structure allows eliminating optical components such as a half mirror, eliminating an isolation of false trigger signals, so that a simple structure both in optical and electrical systems is achievable. The measuring instrument of an eccentricity of polygon mirror motors of the present invention thus can measure accurately an eccentricity with a simple construction at a lower cost.

DETAILED DESCRIPTION OF PREFERRED EMBODIMENTS

Exemplary embodiments of the present invention are demonstrated hereinafter with reference to the accompanying drawings.

First Exemplary Embodiment

Polygon mirror motors are used in laser beam printers and full-color copiers, and they directly relate to printing quality, so that they are required to be superbly accurate. The polygon mirror is directly connected to an output shaft of a brush-less DC motor, and is spun at a high speed such as several tens of thousand rpm. The number of facets of the polygon mirror can be 2, 4, 6, 8 or the like, and the number is determined by a design of an optical system of those printers or copiers. In this first embodiment, four-facets polygon mirror is used for simplifying the description.

Figure 1:
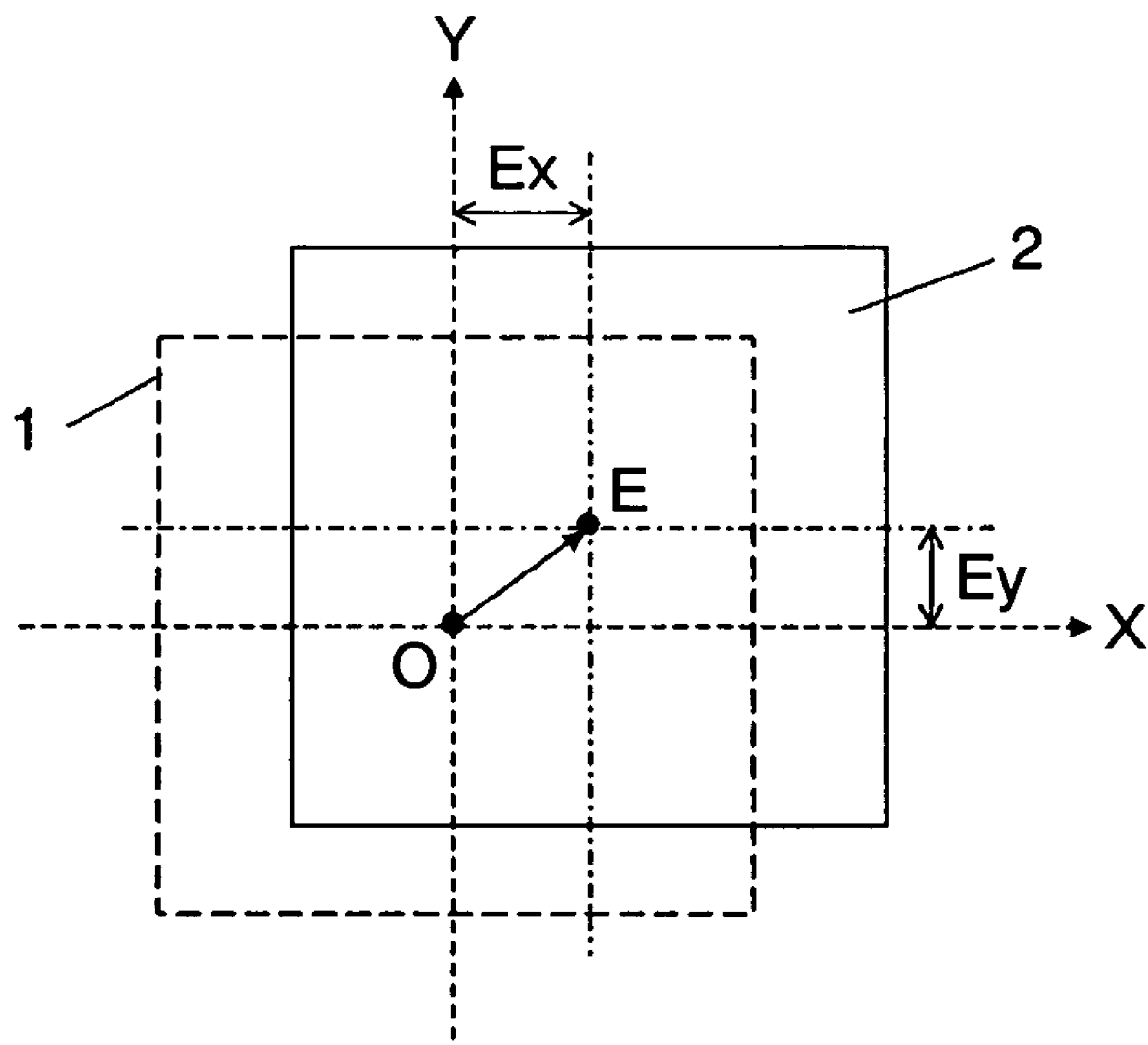
FIG. 1 schematically defines an eccentricity in accordance with a first exemplary embodiment of the present invention.

FIG. 1 schematically defines the eccentricity in accordance with the first embodiment. Assume that two polygon mirrors exist; one is ideal polygon mirror 1 having no eccentricity, and the other one is polygon mirror 2 having eccentricity E. The rotational center of mirror 2 deviates from rotational center O of mirror 1 by displacement amount E, then this amount E is referred to as an eccentricity. The present invention measures component Ex along x-direction and component Ey along y-direction of eccentricity E, then finds eccentricity E by formula 1:

$$E=\sqrt{Ex^2+Ey^2} \quad (1)$$

Figure 2:
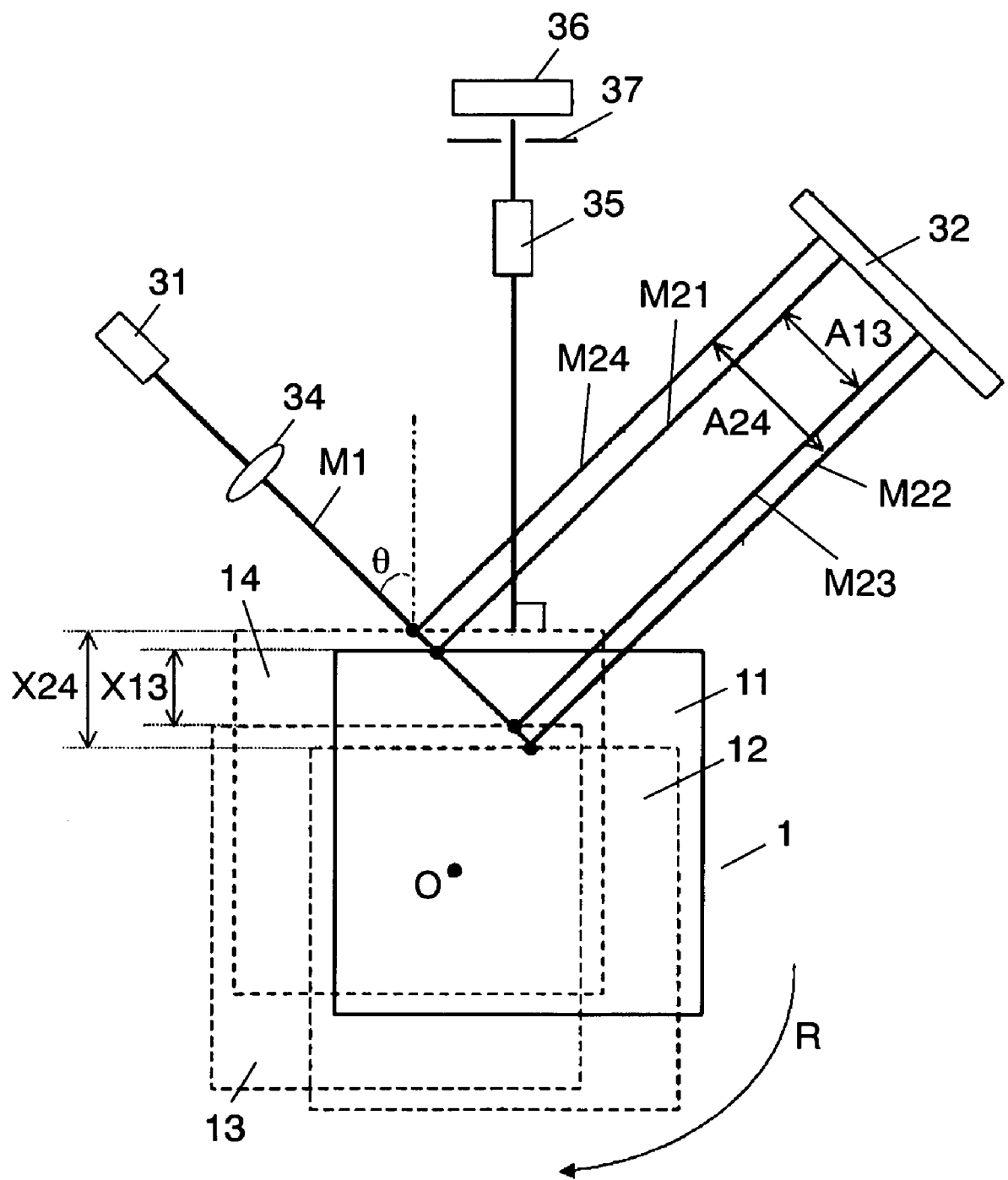
FIG. 2 schematically describes a principle of measuring an eccentricity in accordance with the first exemplary embodiment of the present invention.

FIG. 2 schematically describes a principle of measuring an eccentricity in accordance with the first exemplary embodiment of the present invention. Assume that polygon mirror 1 has four facets, and the motor (not shown) thereof is being driven. When mirror 1 looks upright on FIG. 2, this posture is defined as "0 degree posture", which occurs four times in one rotation of mirror 1, namely 0-degree postures 11, 12, 13 and 14. If polygon mirror 1 has an eccentricity, and when mirror 1 is viewed from the 0-degree postures 11, 12, 13 and 14, displacement occurs in the mirror facets along the vertical (up-down) direction on the paper (FIG. 2). Displacement x13 between 0-degree posture 11 and posture 13 is component Ex (or Ey). Displacement x24 between posture 12 and posture 14 is component Ey (or Ex). Substitution of these specific Ex, Ey for those in formula 1 allows finding eccentricity E.

In FIG. 2, a measuring light beam emitted from first light source 31 passes through optical lens 34, e.g. an objective lens, and reflects on polygon mirror 1, then enters to position detecting element 32, which is disposed laterally for detecting the position along rotating direction R of mirror 1. In order to detect the 0-degree position of mirror 1, second light source 35, photo detecting element 36 (e.g. a photo diode) and slit 37 are arranged on one straight line in FIG. 2.

First measuring light beam M1 emitted from first light source 31 enters to mirror 1 in 0-degree posture at incident angle θ. The first reflection light beam reflected on mirror 1 shifts to M21 when mirror 1 is in 0-degree posture 11, and shifts to M22 mirror 1 is in posture 12, also shifts to M23 in posture 13, and shifts to M24 in posture 14.

Assume that A13 is a difference in an output level supplied from position detecting element 32 between 0-degree posture 11 and posture 13, and A24 is a difference in output level between posture 0-degree 12 and posture 14. Then the following formulas (2) and (3) are found, where the optical axis of second light source 35 tilts at angle θ with respect to the optical axis of first light source 31.

$$x13=A13 \cdot \cos\theta \quad (2)$$

$$x24=A24 \cdot \cos\theta \quad (3)$$

Component Ex of eccentricity E is a half of the height difference (X13) in FIG. 2 between the first facet and the third facet due to rotation. Component Ey is a half of the height difference (X24) in FIG. 2 between the second facet and the fourth facet due to rotation. The following formulas (4) and (5) can be thus found.

$$Ex=(x13)/2 \quad (4)$$

$$Ey=(x24)/2 \quad (5)$$

Substitution of formulas (2), (3), (4) and (5) for those in formula (1) allows finding eccentricity E by the following formula (6).

$$E=\frac{1}{2}\cos\theta\sqrt{A13^2+A24^2} \quad (6)$$

Figure 3:
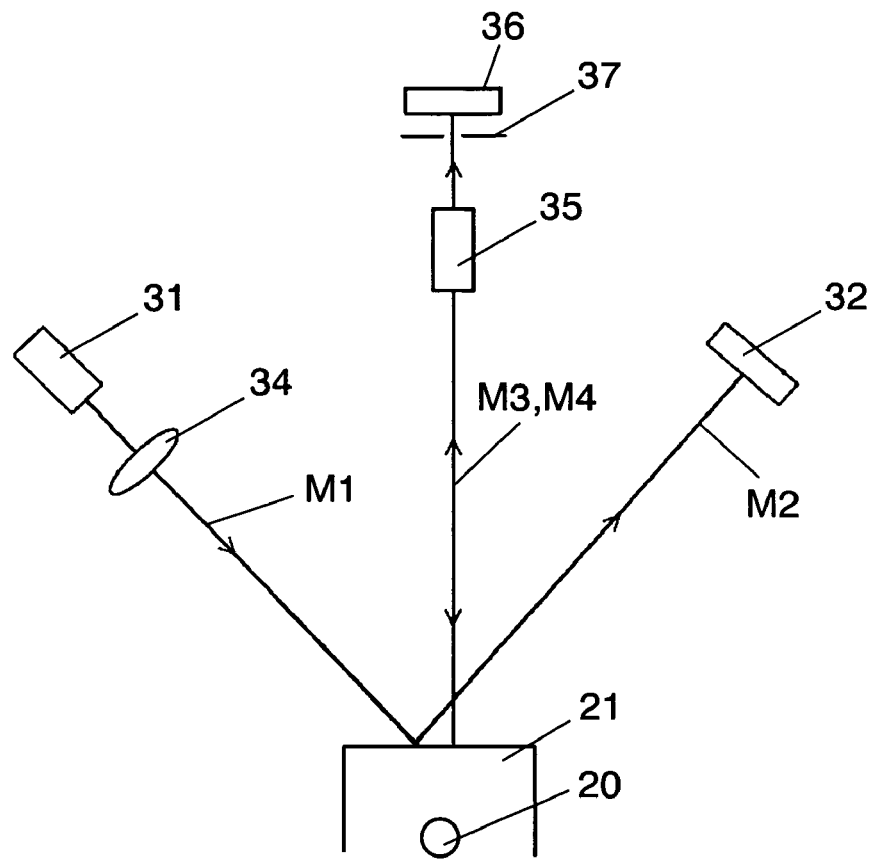
FIG. 3 shows a structure of an instrument measuring an eccentricity in accordance with the first exemplary embodiment of the present invention.
Figure 4:
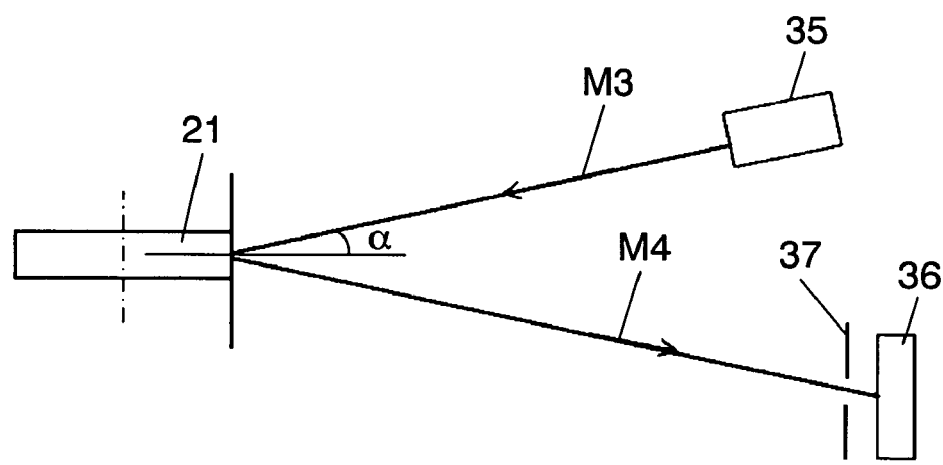
FIG. 4 shows a supplementary description of the instrument measuring an eccentricity in accordance with the first exemplary embodiment of the present invention.

Next, the eccentricity measuring instrument in accordance with the first embodiment is detailed hereinafter with reference to FIG. 3–FIG. 6. FIGS. 3 and 4 show the structure of the optical system. FIG. 3 shows a schematic diagram viewed from rotating shaft 20 of the polygon mirror motor (not shown) which is an object to be measured. FIG. 4 shows a schematic diagram viewed from right angles with respect to rotating shaft 20.

The measuring light beam emitted from first light source 31 passes through optical lens 34 (e.g. objective lens) and enters to polygon mirror 21 as first measuring light beam M1, then reflected on mirror 21 as first reflection light beam M2, which then enters to position detecting element 32.

Position detecting element 32 employs a one-dimensional PSD (Position Sensitive Detector), which is a position sensor of a spot light and makes use of surface resistance of a photo diode. The PSD can obtain consecutive analog signals because it is a non-split type different from CCD, and it is excellent in responsiveness. As discussed previously, an output of this position detecting element 32 changes in response to an eccentricity of the polygon mirror motor.

On the other hand, second measuring light beam M3 emitted from second light source 35 reflects on polygon mirror 21 as second reflection light beam M4, then enters to photo detecting element 36 via slit 37. As shown in FIG. 4, second reflection light beam M3 enters to mirror 21 not at right angles but slantingly at angle α to mirror 21. Second reflection light beam M4 thus travels slantingly and enters into photo detecting element 36 free from interfering with second light source 35. Greater incident angles α of light beam M3 will increase measuring errors, so that the angle is set as small as possible. To be more specific, the angle between second measuring light beam M3 and second reflection light beam M4 is set within the range from not less than 10 degrees to not more than 30 degrees.

As discussed above, the measuring errors increase at a greater incident angle α of second measuring light beam M3. The reason is this: Tilt of the mirror, or machining accuracy of the mirror facets causes second reflection light beam M4 to enter into photo detecting element 36 with a deviation of timing. Therefore, it is preferable to set angle α as small as possible within the permissible range when second light source 35 and photo detecting element 36 are installed with respect to polygon mirror 21.

As the foregoing description proves, a plane formed by first measuring light beam M1 and first reflection light beam M2 intersects with a plane formed by second measuring light beam M3 and the second reflection light beam M4 at right angles.

Figure 5:
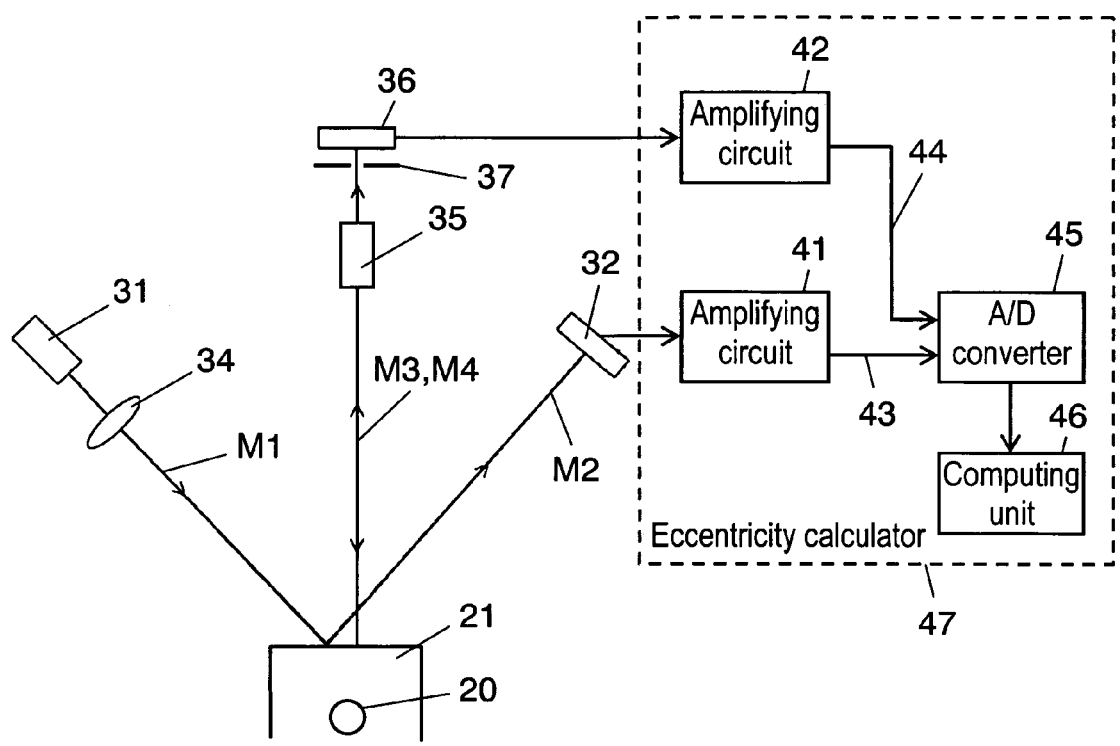
FIG. 5 shows an entire structure of the instrument measuring an eccentricity in accordance with the first exemplary embodiment of the present invention.

Next, a method of measuring an eccentricity is detailed hereinafter with reference to FIGS. 5 and 6. FIG. 5 shows an entire structure of the measuring instrument including an electric system, and FIG. 6 shows schematically the waveforms of the measuring instrument.

An output from position detecting element 32 is amplified by amplifying circuit 41, and amplified signal 43 is fed into A/D converter (analog/digital converter) 45. In a similar manner, an output from photo detecting element 36 is amplified by amplifying circuit 42, and amplified signal 44 is fed into A/D converter 45.

Figure 6:
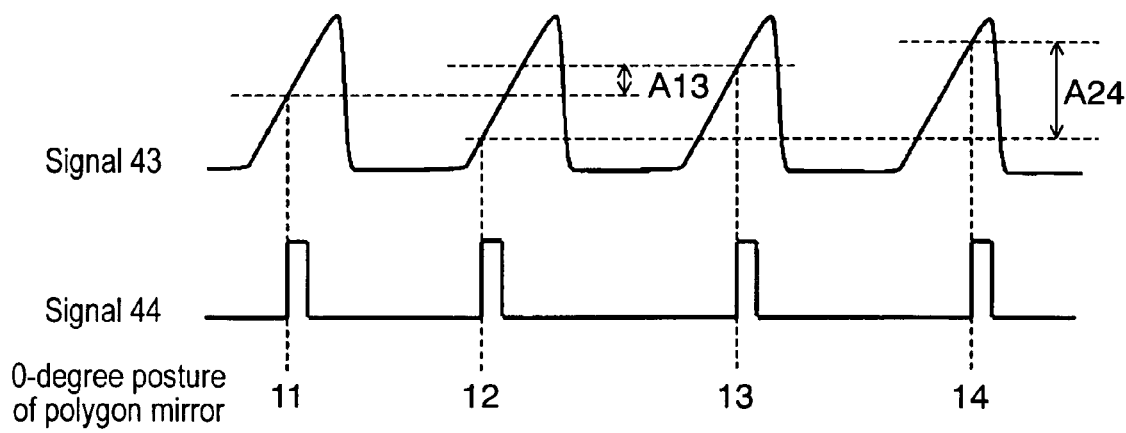
FIG. 6 shows waveforms of the instrument measuring an eccentricity in accordance with the first exemplary embodiment of the present invention.

FIG. 6 shows the waveforms of signal 43 and signal 44. At the time when a rising edge occurs, polygon mirror 21 takes the 0-degree posture, and a level of signal 43 at this time is measured. The measurement obtains deviation A13 between 0-degree posture 11 and posture 13 of mirror 21 as well as deviation A24 between posture 12 and posture 14. The foregoing description uses the rising edge of signal 44 for detecting the 0-ddegree posture of mirror 21; however, the falling edge thereof can be used instead. This can be done by a mechanical placement of the optical system.

In FIG. 5, an output from A/D converter 45 is fed into computing unit 46 where formula (6) is calculated to find eccentricity E. Computing unit 46, A/D converter 45, and amplifying circuits 41, 42 form eccentricity calculator 47.

The foregoing description uses the polygon mirror having four facets; however, the polygon mirrors mounted to the motors employed in laser beam printers or full-color copiers use various numbers of facets such as 2, 4, 6, 8 or the like depending on designs of their optical systems. The present invention is valid regardless of the number of facets.

The foregoing demonstrations prove that the eccentricity measuring instrument of the present invention can eliminate an optical component such as a half mirror, so that the present invention achieves a simple optical system. This measuring instrument does not need to isolate false trigger signals, so that the present invention achieves a simple electrical system. The present invention thus can provide an accurate eccentricity measuring instrument of polygon mirror motors with a simple structure at a reduced cost.

Second Exemplary Embodiment

Figure 7:
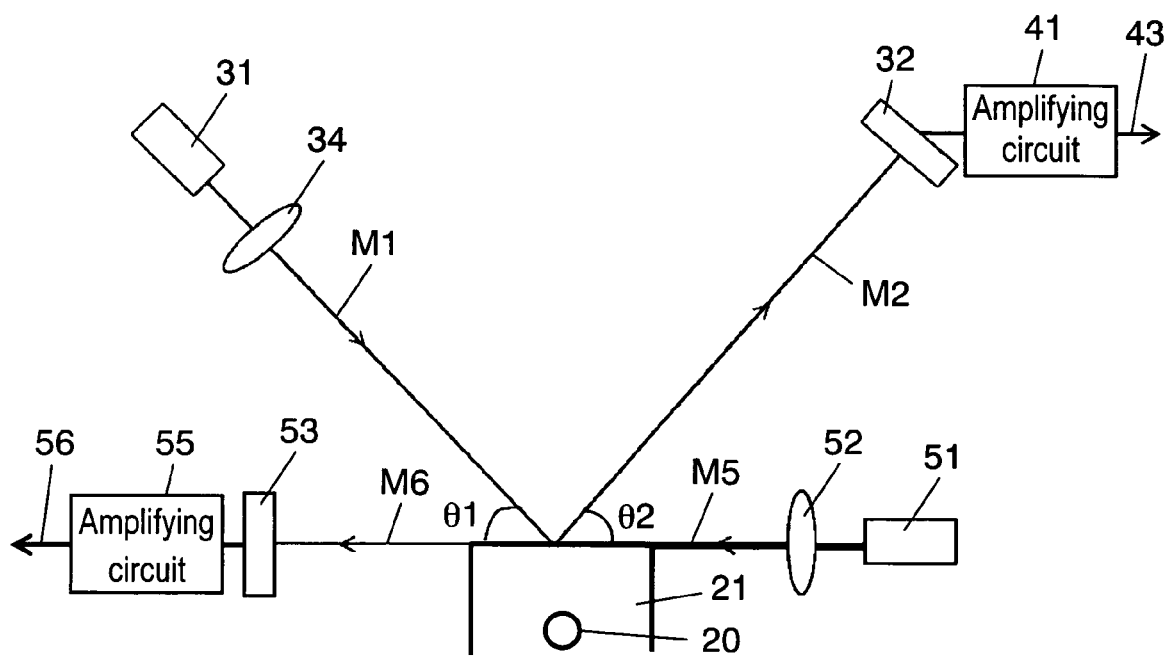
FIG. 7 shows a structure of an instrument measuring an eccentricity in accordance with a second exemplary embodiment of the present invention.
Figure 8:
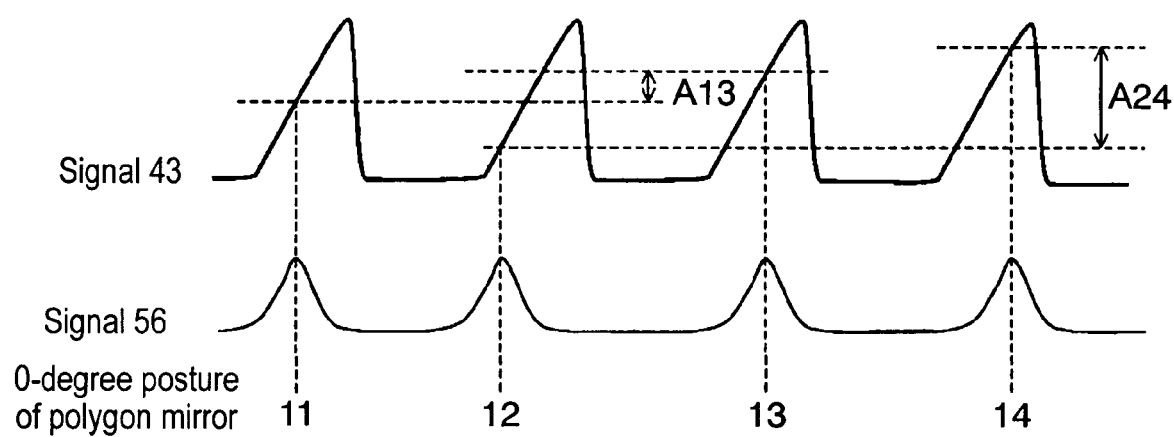
FIG. 8 shows waveforms of the instrument measuring an eccentricity in accordance with the second exemplary embodiment of the present invention.
Figure 9:
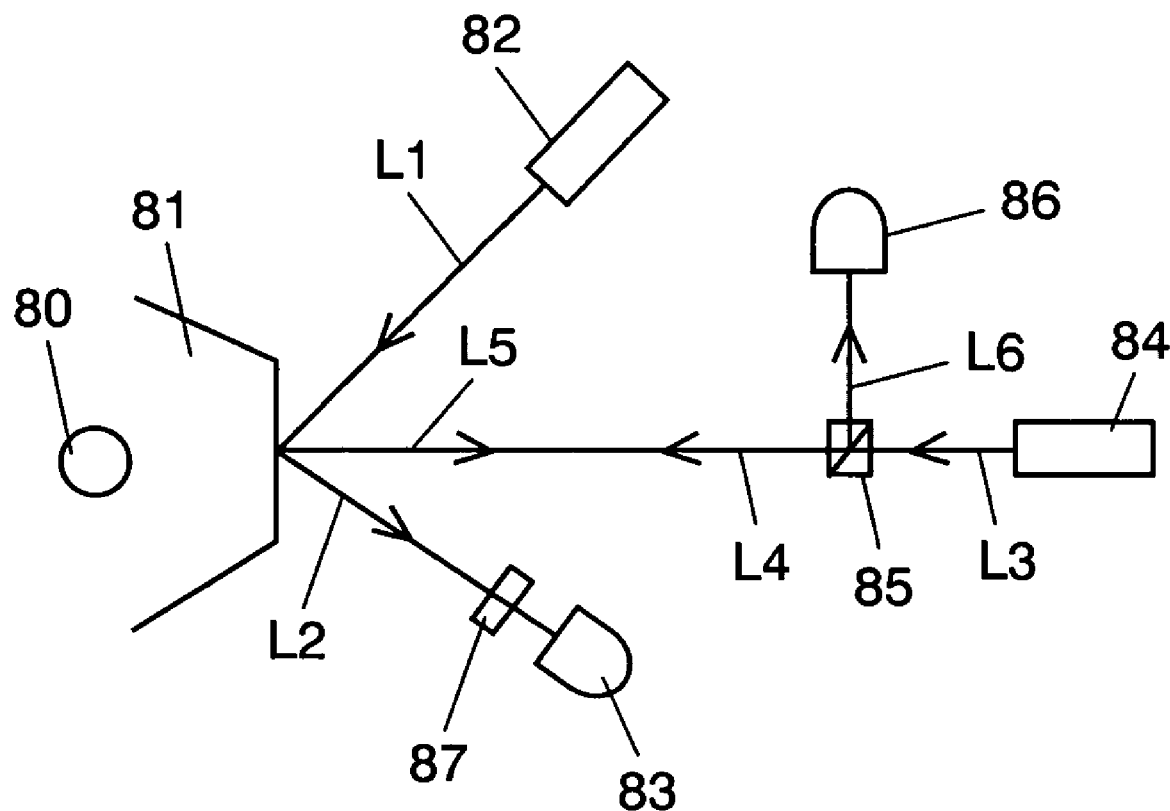
FIG. 9 shows a structure of a conventional instrument measuring an eccentricity.

FIG. 7 shows a structure of an eccentricity measuring instrument in accordance with the second exemplary embodiment of the present invention. FIG. 8 shows the waveforms of the measuring instrument. The measuring instrument of the second embodiment has a similar construction to that of the first embodiment. Similar elements thus have the same reference marks as those of the first embodiment and the descriptions thereof are omitted here, and the structure different from the first embodiment are mainly discussed here.

The measuring light beam emitted from first light source 31 passes through optical lens 34 (e.g. objective lens) and enters to polygon mirror 21 as first measuring light beam M1, then reflected on polygon mirror 21 as first reflection light beam M2, which then enters to position detecting element 32. This is the same mechanism as the first embodiment shows.

A structure of second light source 51 described below differs from the counterpart shown in the first embodiment. Second light source 51 for detecting the 0-degree postures of polygon mirror 21 is placed such that second measuring light beam M5, which is changed to parallel rays by optical lens 52, skims over the reflecting surface of mirror 21. This paralleled second measuring light beam M5 is partially or entirely shut off by polygon mirror 21 rotating, so that it becomes transmitted light beam M6, which is eventually detected by photo detecting element 53 (e.g. photo diode).

An output from photo detecting element 53 is amplified by amplifying circuit 55, whereby signal 56 is obtained. As FIG. 8 shows, signal 56 takes a peak value when mirror 21 takes the 0-degree posture. A level of signal 43 is measured when signal 56 takes the peak value, so that deviation A13 between 0-degree posture 11 of mirror 21 and posture 13 is obtained as well as deviation A24 between 0-degree posture 12 and posture 14 is obtained. Those two deviations find eccentricity E as they do in the first embodiment.

This second measuring light beam M5 can be possibly emitted along rotating shaft 20 of mirror 21; however, it is emitted along the direction perpendicular to rotating shaft 20 in this second embodiment. This structure allows obtaining a sharper waveform when mirror 21 takes the 0-degree postures. In the structure of this second embodiment, second measuring light beam M5 and transmitted light beam M6 travel on the same plane that is formed by first measuring light beam M1 and first reflection light beam M2. Transmitted light beam M6 forms angle θ1 with first measuring light beam M1, and second measuring light beam M5 forms angle θ2 with first reflection light beam M2, where angle θ1 is equal to angle θ2.

The foregoing structure allows eliminating an optical component such as a half mirror, so that the present invention achieves an highly accurate eccentricity measuring instrument of polygon-mirror motors with a simple construction at a lower cost.

What is claimed is:

1. An eccentricity measuring instrument of a polygon-mirror motor fixed a polygon mirror to an output shaft of the motor, the instrument comprising:
   (a) a first light source;
   (b) an optical position detecting element for detecting a position of a first reflection light beam, which is a first measuring light beam emitted from the first light source and reflected on the polygon mirror;
   (c) a second light source;
   (d) a photo detecting element for detecting a position of a second reflection light beam, which is a second measuring light beam emitted from the second light source and reflected on the polygon mirror; and (e) an eccentricity calculator for calculating an output from the optical position detecting element, where the output is taken when the photo detecting element detects the second reflection light beam, wherein the second measuring light beam forms a given angle with the second reflection light beam, and a plane formed by the first measuring light beam and the first reflection light beam intersects with a plane formed by the second measuring light beam and the second reflection light beam at right angles.

2. The eccentricity measuring instrument of claim 1, wherein the given angle falls within a range from not smaller than 10 degrees to not greater than 30 degrees.

3. The eccentricity measuring instrument of claim 1, wherein the second reflection light beam enters to the photo detecting element via a slit.

4. The eccentricity measuring instrument of claim 1, wherein the optical position detecting element is a one-dimensional PSD (Position Sensitive Detector) which outputs an analog signal.

5. The eccentricity measuring instrument of claim 1, wherein the eccentricity calculator includes an A/D (analog/digital) converter and a computing unit.

6. An eccentricity measuring instrument of a polygon-mirror motor fixed a polygon mirror to an output shaft of the motor, the instrument comprising:

(a) a first light source;
(b) an optical position detecting element for detecting a position of a first reflection light beam, which is a first measuring light beam emitted from the first light source and reflected on the polygon mirror;
(c) a second light source;
(d) an optical lens for obtaining a second measuring light beam by paralleling a light beam emitted from the second light source;
(e) a photo detecting element for detecting a transmitted light beam, which is the second measuring light beam transmitted in response to rotations of the polygon mirror; and
(f) an eccentricity calculator for calculating an output from the optical position detecting element, where the output is taken when an output from the photo detecting element reaches a peak value, wherein the second measuring light beam and the transmitted light beam travel on a plane identical to what is formed by the first measuring light beam and the first reflection light beam.

7. The eccentricity measuring instrument of claim 6, wherein an angle formed by the transmitted light beam and the first measuring light beam is equal to an angle formed by the second measuring light beam and the first reflection light beam.

8. The eccentricity measuring instrument of claim 6, wherein the optical position detecting element is a one-dimensional PSD (Position Sensitive Detector) which outputs an analog signal.

9. The eccentricity measuring instrument of claim 6, wherein the eccentricity calculator includes an A/D (analog/digital) converter and a computing unit.

* * * * *